United States Patent
Baek et al.

(10) Patent No.: US 8,805,960 B2
(45) Date of Patent: Aug. 12, 2014

(54) METHOD FOR PROVIDING DATA APPLICATION IN MEDIA REPRODUCTION APPARATUS OF AUTOMOBILE

(75) Inventors: Wonjang Baek, Gyeonggi-do (KR); Seong Baek Lee, Seoul (KR); John Kim, Seoul (KR)

(73) Assignee: SK Planet Co., Ltd., Seoul (KR)

( * ) Notice: Subject to any disclaimer, the term of this patent is extended or adjusted under 35 U.S.C. 154(b) by 431 days.

(21) Appl. No.: 12/314,069

(22) Filed: Dec. 3, 2008

(65) Prior Publication Data

US 2009/0150516 A1    Jun. 11, 2009

(30) Foreign Application Priority Data

Dec. 6, 2007    (KR) ................ 10-2007-0125953

(51) Int. Cl.
*G06F 15/16*      (2006.01)
*G06F 15/173*     (2006.01)

(52) U.S. Cl.
USPC ........... 709/218; 709/217; 709/219; 709/238; 709/240

(58) Field of Classification Search
USPC ............... 709/201–203, 217–222, 238–240; 701/207–209; 340/904
See application file for complete search history.

(56) References Cited

U.S. PATENT DOCUMENTS

| | | | | |
|---|---|---|---|---|
| 6,278,940 B1 * | 8/2001 | Endo | | 701/209 |
| 6,526,335 B1 * | 2/2003 | Treyz et al. | | 701/1 |
| 6,553,410 B2 * | 4/2003 | Kikinis | | 709/218 |
| 6,711,474 B1 * | 3/2004 | Treyz et al. | | 701/1 |
| 6,865,480 B2 * | 3/2005 | Wong | | 701/210 |
| 7,146,260 B2 * | 12/2006 | Preston et al. | | 701/24 |
| 7,200,357 B2 * | 4/2007 | Janik et al. | | 455/3.02 |
| 7,516,011 B1 * | 4/2009 | Kabel et al. | | 701/415 |
| 7,577,717 B2 * | 8/2009 | Smith | | 709/218 |
| 7,610,011 B2 * | 10/2009 | Albrett | | 455/3.04 |
| 7,610,151 B2 * | 10/2009 | Letchner et al. | | 701/209 |
| 7,616,129 B2 * | 11/2009 | Thacher | | 340/905 |
| 7,634,356 B2 * | 12/2009 | Oguchi et al. | | 701/210 |
| 7,652,660 B2 * | 1/2010 | Chen et al. | | 345/156 |
| 7,672,779 B2 * | 3/2010 | Fuchs | | 701/209 |
| 7,693,720 B2 * | 4/2010 | Kennewick et al. | | 704/275 |
| 2002/0164973 A1 * | 11/2002 | Janik et al. | | 455/403 |
| 2003/0003899 A1 * | 1/2003 | Tashiro et al. | | 455/414 |
| 2004/0204833 A1 * | 10/2004 | Yokota | | 701/209 |
| 2005/0177284 A1 * | 8/2005 | Kugumiya et al. | | 701/1 |
| 2005/0187961 A1 * | 8/2005 | Yokota et al. | | 707/102 |
| 2005/0197747 A1 * | 9/2005 | Rappaport et al. | | 701/1 |
| 2007/0159410 A1 * | 7/2007 | Yamamoto et al. | | 345/1.1 |
| 2007/0178830 A1 * | 8/2007 | Janik et al. | | 455/3.06 |
| 2009/0005070 A1 * | 1/2009 | Forstall et al. | | 455/456.1 |
| 2009/0045972 A1 * | 2/2009 | Preston et al. | | 340/825.72 |

FOREIGN PATENT DOCUMENTS

| | | |
|---|---|---|
| KR | 10 2004 0079212 A | 9/2004 |
| KR | 10 0570887 B1 | 4/2006 |

* cited by examiner

*Primary Examiner* — Tae Kim
(74) *Attorney, Agent, or Firm* — Stein IP, LLC

(57) ABSTRACT

A method for providing a data application in a media reproduction apparatus of an automobile is disclosed. In accordance with the method for providing the data application in the media reproduction apparatus of the automobile, an additional data application associated with a base data application is dynamically received according to a communication status and the additional data application is executed on a scene-by-scene basis.

11 Claims, 2 Drawing Sheets

METHOD FOR PROVIDING DATA APPLICATION IN MEDIA REPRODUCTION APPARATUS OF AUTOMOBILE

BACKGROUND OF THE INVENTION

1. Field of the Invention

The present invention relates to a method for providing a data application in a media reproduction apparatus of an automobile, and more particularly to a method for providing a data application in a media reproduction apparatus of an automobile wherein an additional data application associated with a base data application is dynamically received according to a communication status and the additional data application is executed on a scene-by-scene basis.

2. Description of the Related Art

A mobile computer system installed in a vehicle, also known as a carputer, is an apparatus that executes a data application or provides other various functions such as a navigation, an internet connection and a wireless communication.

The mobile computer system is capable of executing and providing various data applications based on an operating system similar to a conventional computer system. However, a cost for purchasing and installing the mobile computer system is much higher compared to that of a conventional car media reproduction apparatus. Therefore, the popularization of the mobile computer system is expected to be delayed compared to that of the car media reproduction apparatus.

On the other hand, the car media reproduction apparatus provides media contents such as audio and video to passengers. The car media reproduction apparatus focuses on receiving a radio broadcast and reproducing an audio data recorded on a cassette tape. In addition, as new storage media formats are developed, the car media reproduction apparatus is capable of reproducing an audio data and/or a video data stored in the storage media such as a CD and/or a DVD. Moreover, the car media reproduction apparatus may be also capable of receiving a DMB (Digital Multimedia Broadcasting) or a digital broadcasting.

The storage media for storing a data is changing from the CD and DVD to a HD-DVD and a Blu-ray disk of higher capacity. As the storage media is changing, the car media reproduction apparatus is expected to be capable of processing a high capacity optical disk storage media such as the Blu-ray disk and the HD-DVD.

Hereinafter, an "optical disk storage media" refers to the Blu-ray disk and the HD-DVD of a next generation storage media as well as the conventional CD, DVD and LD. In addition, the car media reproduction apparatus refers to an apparatus for reproducing the audio data, the video data and/or an additional data stored in the optical disk storage media.

In accordance with a specification of the Blu-ray disk or the HD-DVD, HDi (High Definition interactive) or BD-J for providing a data application service is under development. The HDi is a standard for supporting the data application service and an advanced user menu, and the BD-J is a standard for supporting the data application service for the Blu-ray disk.

When an interactive service specification for the optical disk storage media such as the BD-J or the HDi is employed, the car media reproduction apparatus may execute and provide the data application. In addition, when the car media reproduction apparatus is capable of a wireless communication, the car media reproduction apparatus is expected to execute and provide the data application through the wireless communication.

However, a method for providing the data application in the car media reproduction apparatus has following drawbacks.

First, the car media reproduction apparatus has limited resources.

Although a performance of the car media reproduction apparatus is improving, the car media reproduction apparatus is intended to reproduce the audio data and/or video data. Therefore, the resources allocated to process the data application in the car media reproduction apparatus are limited.

When a capacity of the data application is too large, the data application cannot be executed due to a small memory resource and a low performance CPU of the car-media reproduction apparatus.

When the car media reproduction apparatus is capable of the wireless communication, the car media reproduction apparatus may provide the data application received from an external data application providing apparatus through the wireless communication according to the HDi and BD-J specifications.

However, even when the car media reproduction apparatus is capable of the wireless communication, a bandwidth that may be utilized for receiving the data application is limited. Therefore, a designer of the data application should design the data application to minimize the size of the data application in order to receive the data application in short time. As a result, various configurations cannot be employed for the data application, which prevents a personalized data application.

Moreover, in some cases, the data application cannot be received by the car media reproduction apparatus due to a quality of wireless communication. Accordingly, a reliability of providing the data application is degraded.

Further, a time required for executing and providing the data application selected by a user may be extremely long when the size of the data application is too large. That is, large data application takes a long time to load and process.

SUMMARY OF THE INVENTION

It is an object of the present invention to provide a method for providing a data application in a media reproduction apparatus of an automobile wherein an additional data application associated with a base data application is dynamically received according to a communication status and the additional data application is executed on a scene-by-scene basis.

In accordance with a first aspect of the present invention, there is provided a method for providing an additional data application in a media reproducing apparatus of an automobile, the method comprising steps of: (a) executing a base data application displayed on an initial screen as the media reproducing apparatus; (b) selecting a path for obtaining the additional data application to be provided to a user, the additional data application associated with an execution of the base data application; and (c) obtaining and executing the additional data application based on the path selected in the step (b).

DETAILED DESCRIPTION OF THE INVENTION

The present invention will now be described in detail with reference to the accompanied drawings. The interpretations of the terms and wordings used in Description and Claims should not be limited to common or literal meanings. The embodiments are provided for the skilled in the art to more completely understand the present invention.

Figure 1:
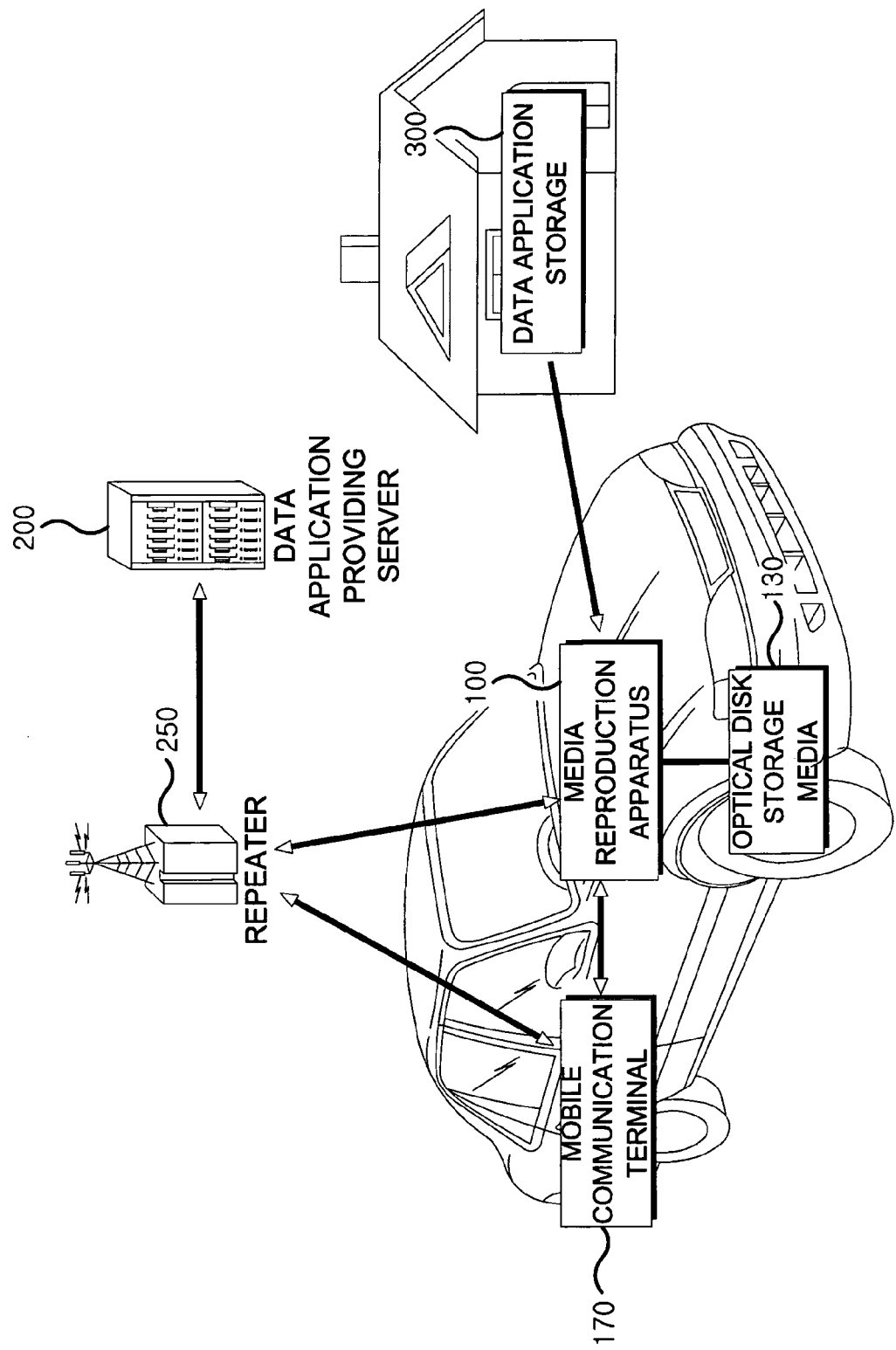
FIG. 1 is a diagram illustrating an application environment of a method for providing a data application in a media reproduction apparatus of an automobile in accordance with the present invention.

FIG. 1 is a diagram illustrating an application environment of a method for providing a data application in a media reproduction apparatus of an automobile in accordance with the present invention.

As shown in FIG. 1, the application environment in accordance with the present invention includes a media reproduction apparatus 100 of an automobile, a data application providing server 200 and a data application storage 300. In addition, the application environment in accordance with the present invention may include an optical disk storage media 130 and a mobile communication terminal 170.

The media reproduction apparatus 100 is installed in the automobile and executes a base data application and an additional data application.

Preferably, the media reproduction apparatus 100 may execute the base data application and the additional data application stored therein or may execute the base data application stored in the optical disk storage media 130.

The media reproduction, apparatus 100 may receive the additional data application from the data application storage 300 through a wireless communication and/or a wired communication, and receive the additional data application from the data application providing server 200 through a near field communication with the mobile communication terminal 170.

The optical disk storage media 130 stores the base data application.

Preferably, the optical disk storage media 130 may be associated by the media reproduction apparatus 100 to provide the base data application to the media reproduction apparatus 100.

The optical disk storage media 130 may include at least one of a Blu-ray disk, a HD-DVD and a DVD.

The mobile communication terminal 170 transmits and receives the additional data application through the near field wireless communication such as a Bluetooth connection. That is, the mobile communication terminal 170 may relay a communication between the data application providing server 200 and the media reproduction apparatus 100 through the wireless communication.

The data application providing server 200 transmits the additional data application to the media reproduction apparatus 100 through the wireless communication and/or to the data application storage 300 through the wired communication.

The data application storage 300 is installed at home and transmits the additional data application received from the data application providing server 200 to the media reproduction apparatus 100.

Specifically, the data application storage 300 receives the additional data application from via the wireless communication and/or the wired communication and stores the received additional data application. The data application storage 300 transmits the additional data application stored therein to the media reproduction apparatus 100 through the wireless communication and/or the wired communication.

The method for providing the data application in the media reproduction apparatus of the automobile in accordance with the present invention based on the application environment is described in detail below.

Figure 2:
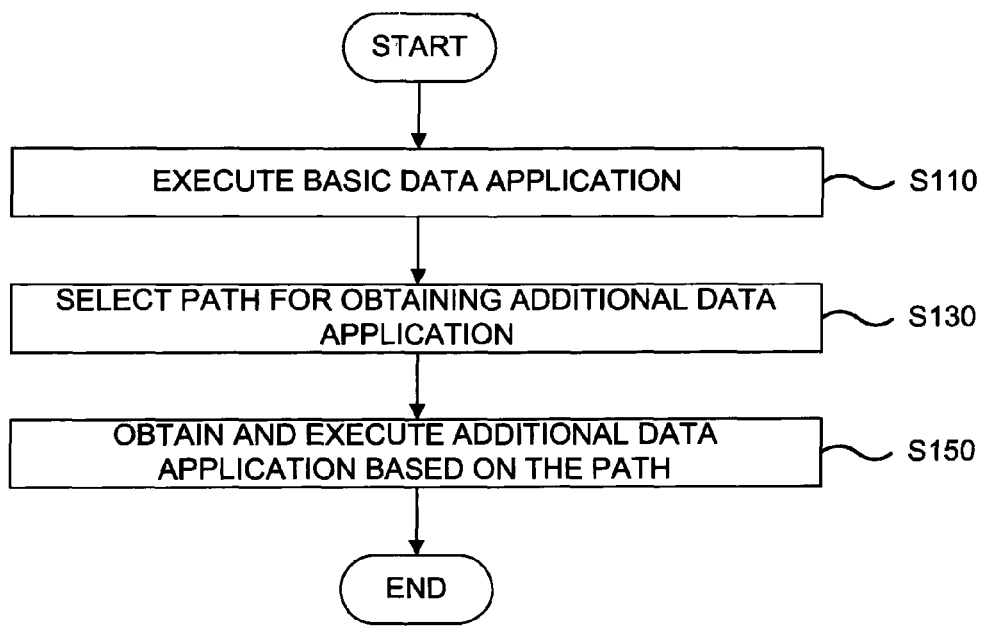
FIG. 2 is a flow diagram illustrating a method for providing a data application in a media reproduction apparatus 6f an automobile in accordance with the present invention.

FIG. 2 is a flow diagram illustrating the method for providing the data application in the media reproduction apparatus of the automobile in accordance with the present invention.

The media reproduction apparatus 100 executes a base data application (S110).

Specifically, the base data application is a data application for providing a user interface including a menu icon displayed as an initial screen on a display device (not shown) connected to the media reproduction apparatus 100.

When a user selects, through the user interface provided by the base data application, a desired additional data application represented by the menu icon such as a traffic information, a weather information or a location information, the media reproduction apparatus 100 executes the selected additional data application.

The base data application may be stored in the media reproduction apparatus 100 or the optical disk storage media 130. Moreover, the base data application may be stored in a non-volatile memory storage media such as a mobile USB storage employing a flash memory or a magnetic storage media such as a hard disk drive.

In one embodiment, when a power is applied to the media reproduction apparatus 100, the media reproduction apparatus 100 may read and execute the base data application stored therein regardless of the playback of the optical disk storage media 130.

Preferably, a manufacturer of the media reproduction apparatus 100 may design the base data application suitable for an execution environment of the additional data application and store the same in the media reproduction apparatus 100.

In addition, the media reproduction apparatus 100 may update the base data application periodically. That is, the manufacturer of the media reproduction apparatus 100 may provide an updated version of the base data application suitable for the execution environment of the additional data application.

During an update process of the base data application stored in the media reproduction apparatus 100, an update data for updating the base data application may be received from a server run by the manufacturer, i.e. a base data application providing server (not shown). The base data application may then be updated based on the update data and stored in the media reproduction apparatus 100.

In another embodiment, a manufacturer of a content stored in the optical disk storage media 130 may design the base data application to be suitable for the execution environment of the additional data application and store the same the optical disk storage media 130.

As a result, the media reproduction apparatus 100 may associate with the optical disk storage media 130 to provide the base data application stored in the optical disk storage media 130.

The manufacturer of the content may manufacture and store the base data application in the optical disk storage media 130 in a manner that the user may select the additional data application related to an additional information, a sale information and an advertisement information.

In addition, the manufacturer of the content may update the base data application stored in the optical disk storage media 130.

During an update process of the base data application stored in the optical disk storage media 130, the update data for updating the base data application may be received from the server run by the manufacturer of the content, i.e., the base data application providing server (not shown). The base data application may then be updated and stored based on the update data.

Thereafter, a path for obtaining an additional data application is selected in response to a base data application request of the user generated by a user input interface (S130).

Two different paths, i.e. an internal path and an external path for obtaining the additional data application may be employed.

A detailed description of selecting the internal path is given below.

When the additional data application does not require a real-time characteristic, the additional data application may be stored in the media reproduction apparatus 100.

The media reproduction apparatus 100 selects the internal path wherein the additional data application stored in the media reproduction apparatus 100 is read from the media reproduction apparatus 100 and provides the additional data application that does not require the real-time characteristic to the user.

The additional data application is stored in the media reproduction apparatus 100 according to following scheme.

When the data application storage 300 receives the additional data application from the application providing server 200 through the wired and/or the wireless communication, the data application storage 300 may transmit the additional data application to the media reproduction apparatus 100. The media reproduction apparatus 100 stores the additional data application received from the data application storage 300. When the internal path is selected, the additional data application stored in the media reproduction apparatus 100 is read therefrom.

A detailed description of selecting the external path is given below.

When the additional data application requires the real-time characteristic, the additional data application is received through the wireless communication.

The media reproduction apparatus 100 selects the external path wherein the additional data application is received and stored in the media reproduction apparatus 100 from an external apparatus and provides the additional data application to the user.

The media reproduction apparatus 100 receives the additional data application from the application providing server 200 directly, or through the mobile communication terminal 170.

When the media reproduction apparatus 100 is to receive the additional data application from the application providing server 200 directly, the media reproduction apparatus 100 connects to the application providing server 200 through the wireless communication such as WiBro.

When the additional data application is received by the mobile communication terminal 170, the media reproduction apparatus 100 receives the additional data application from the mobile communication terminal 170 by carrying out the near field wireless communication with the mobile communication terminal 170.

That is, when the mobile communication terminal 170 receives the additional data application from the application providing server 200 through the repeater 250, the mobile communication terminal 170 transmits the additional data application to the media reproduction apparatus 100 via the near field wireless communication such as the Bluetooth.

The user may select one of the application providing server 200 and the mobile communication terminal 170 such that the additional data application is received by the media reproduction apparatus 100.

Thereafter, the additional data application is obtained and executed based on the path for obtaining the additional data application selected by the user (S150).

The media reproduction apparatus 100 reads the additional data application stored therein or receives the additional data application from the mobile communication terminal 170 or the data application providing server 200.

However, the additional data application executable by the media reproduction apparatus 100 is limited by a system resource and a communication speed of the media reproduction apparatus 100. Therefore, it is preferable that the additional data application is divided according to scenes and executed on a scene-by-scene basis.

A method for executing the additional data application divided according to scenes is described below.

Figure 3:
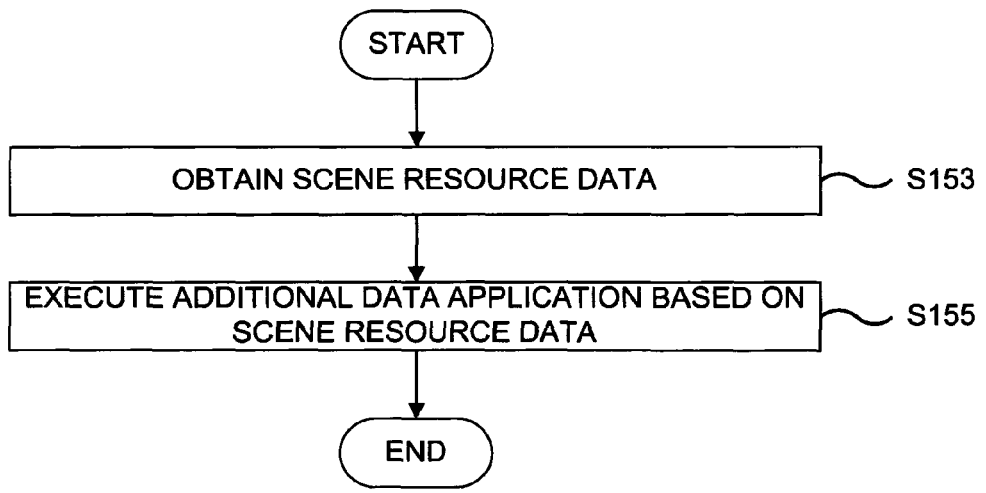
FIG. 3 is a flow diagram illustrating a method for executing the additional data application according to scenes.

FIG. 3 is a flow diagram illustrating a method for executing the additional data application according to scenes.

Referring to FIG. 3, the media reproduction apparatus 100 obtains a scene resource data of a first scene to be provided to the user (S153). Specifically, the media reproduction apparatus 100 selects and obtains the scene resource data corresponding to the first scene to be provided to the user from a plurality of scenes constituting the additional data application.

For instance, when the media reproduction apparatus 100 receives the additional data application from the mobile communication terminal 170 or the data application providing server 200, the media reproduction apparatus 100 may receive only the scene resource data corresponding to the first scene to be provided to the user instead of receiving an entirety of the additional data application as in the conventional method.

Therefore, in accordance with the present invention, when the media reproduction apparatus 100 provides the additional data application in the automobile, a time required for receiving the additional data application is minimized and a standby time required for loading or executing the received additional data application is also minimized.

Thereafter, the additional data application is executed based on the obtained scene resource data (S155).

The scene resource data may include a scene-by-scene execution code and a scene-by-scene execution resource data to be executable independently at each scene included in the additional data application. Moreover, the scene resource data may include an identification information.

That is, the media reproduction apparatus 100 may obtain smoothly a scene resource data corresponding to a second scene for a selection of the user using the identification information included in the scene resource data when the media reproduction apparatus 100 provides the second scene provided by a selection of the user other than the first scene.

In addition, the media reproduction apparatus 100 may use an additional data in order to execute the additional data application stored in the media reproduction apparatus 100 or received from the mobile communication terminal 170 or the data application providing server 200.

For instance, when the media reproduction apparatus 100 includes a navigation function, the media reproduction apparatus 100 requires the additional data, i.e. a current location data in order to execute the navigation function. Therefore, when a GPS receiver (not shown) is installed in the automobile having the media reproduction apparatus 100, the media reproduction apparatus 100 receives the current location data from the receiver. The media reproduction apparatus 100 may execute and provide the additional data application for the navigation function using the received current location data.

In addition, when the additional data application for a car management is executed, the media reproduction apparatus 100 measures a current status data reflecting a current status through an ECU (Electronic Control Unit) installed in the automobile and executes the additional data application for the car management.

As described above, in accordance with the method for providing the additional data application in the media reproduction apparatus of the automobile, the user may be provided with various additional data applications using the media reproduction apparatus even when the user does not purchase the highly priced mobile computer system. For instance, in accordance with the present invention, the media reproduction apparatus may provide the additional data application such as the navigation function even when the system resource is limited.

Particularly, when the media reproduction apparatus includes a blu-ray player, the blu-ray player may provide the additional data application.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. A method for providing an additional data application in a media reproducing apparatus of an automobile, the method comprising steps of:
   (a) executing a base data application wherein the base data application provides an initial screen displayed on a display device connected to the media reproducing apparatus;
   (b) selecting a communication path for obtaining the additional data application from a data application providing server to be provided to a user wherein the additional data application is associated with the base data application and selected based on a user input from the user referring to the initial screen, the communication path being selected from one of a first communication path and a second communication path according to a real-time characteristic of the additional data application, wherein the first communication path is selected for obtaining the additional data application so that a data application storage apparatus receives the additional data application from the data application providing server via a wireless communication or a wired communication, and the data application storage apparatus transmits the additional data application to the media reproduction apparatus, while the second communication path is selected for obtaining the additional data application from the data application providing server via a wireless link; and
   (c) obtaining and executing the additional data application based on the communication path selected in the step (b).

2. The method in accordance with claim 1, wherein the step (a) comprises reading and executing the base data application stored in an optical disk storage media supported by the media reproducing apparatus.

3. The method in accordance with claim 2, wherein the step (a) comprises updating the base data application by receiving an update data from a base data application providing server providing the update data for the base data application through a communication with the additional data application providing server.

4. The method in accordance with claim 2, wherein the optical disk storage media includes at least one of a blu-ray disk, a HD-DVD and a DVD.

5. The method in accordance with claim 1, wherein the step (a) comprises reading and executing the base data application stored in the media reproducing apparatus.

6. The method in accordance with claim 1, wherein the additional data application executable on a scene-by-scene basis includes a plurality of scenes, and
   wherein the step (c) comprises:
   (c-1) obtaining a scene resource data corresponding to a first scene to be provided to a user form at least one of the plurality of scenes included in the additional data application, and
   (c-2) executing the additional data application based on the scene resource data corresponding to the first scene.

7. The method in accordance with claim 6, wherein the scene resource data includes at least one of an execution code and an execution resource data executable the scene-by-scene basis about the first scene.

8. The method in accordance with claim 6, wherein the scene resource data includes an identification information for obtaining a scene resource data corresponding to a second scene of the plurality of scenes.

9. The method in accordance with claim 1, wherein the step (c) comprises:
   (c-1) measuring an additional data for executing the additional data application; and
   (c-2) executing the additional data application based on the additional data.

10. The method in accordance with claim 1, further comprising:
    (d) checking a communication status with the data application storage apparatus storing the additional data application; and
    (e) receiving and storing the additional data application when a communication is established with the data application storage apparatus, prior to carrying out the step (a).

11. A method for providing an additional data application in a media reproducing apparatus of an automobile, the method comprising steps of:
    at a data application storage installed at home, receiving a first type of the additional data application from a data application providing server, wherein the first type of the additional data application does not require a real-time characteristic;
    at the data application storage, transmitting the first type of the additional data application to the media reproducing apparatus;
    at the media reproducing apparatus, storing the first type of the additional data application;
    at the media reproducing apparatus, executing a base data application;
    at the data application providing server, transmitting a second type of the additional data application to the media reproducing apparatus via a wireless link;
    at the media reproducing apparatus, receiving user input for selecting the additional data application associated with the base data application; and
    at the media reproducing apparatus, determining whether the selected additional data application is the first type or the second type, and differently executing the additional data application depending on the type of the additional data application, wherein in case the selected additional data application is the first type, the media reproducing apparatus executes the additional data application stored therein, and in case the selected additional data application is the second type, the media reproducing apparatus receives the second type of the additional data application from the data application providing server and then executes the received additional data application.

* * * * *